US008051487B2

(12) United States Patent
Huang et al.

(10) Patent No.: US 8,051,487 B2
(45) Date of Patent: Nov. 1, 2011

(54) CASCADING SECURITY ARCHITECTURE

(75) Inventors: Fei Huang, Fremont, CA (US); Shu Huang, San Jose, CA (US); Liwei Ren, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 1219 days.

(21) Appl. No.: 11/413,754

(22) Filed: Apr. 27, 2006

(65) Prior Publication Data

US 2006/0253445 A1 Nov. 9, 2006

Related U.S. Application Data

(60) Provisional application No. 60/679,458, filed on May 9, 2005.

(51) Int. Cl.
*G06F 7/04* (2006.01)
(52) U.S. Cl. .............................. 726/27; 726/2
(58) Field of Classification Search ........................ None
See application file for complete search history.

(56) References Cited

U.S. PATENT DOCUMENTS

| | | | |
|---|---|---|---|
| 6,493,709 B1 | 12/2002 | Aiken | |
| 6,584,470 B2 | 6/2003 | Veale | |
| 6,820,082 B1 | 11/2004 | Cook et al. | |
| 7,031,972 B2 | 4/2006 | Ren et al. | |
| 7,260,555 B2 * | 8/2007 | Rossmann et al. | 705/51 |
| 7,380,120 B1 * | 5/2008 | Garcia | 713/160 |
| 7,694,328 B2 * | 4/2010 | Joshi et al. | 726/2 |
| 2003/0172066 A1 | 9/2003 | Cooper et al. | |
| 2006/0005017 A1 * | 1/2006 | Black et al. | 713/165 |

OTHER PUBLICATIONS

IDS Certification Statement (3 pages), Dec. 18, 2009.
Translation of the Office Action for CN Application No. 200680021385.3 (4 pages).
Anagnostopoulos, A. et al., "Sampling Search-Engine Results," Proceedings of the 14th International Conference on World Wide Web, WWW 2005, May 10-14, 2005, pp. 245-256, Chiba, Japan.
Chen, J. et al., "Knowledge Discovery and Data Mining Based on Power Plant Real-Time Database: A Survey," Proceedings of International Conference on Power Engineering, Oct. 8-12, 2001, pp. 1-5, Xi'an, China.
Chen, L. et al., "Template Detection for Large Scale Search Engines," SAC '06, Apr. 23-27, 2006, 5 pages, Dijon, France.
Hamilton, N., "The Mechanics of a Deep Net Metasearch Engine," Proceedings of the 12th International World Wide Web Conference, 2003, 2 pages.
Jessop, M. et al., "Pattern Matching Against Distributed Datasets," 6 pages, Sep. 3, 2004.
Lai, W. C. et al., "An Anatomy of a Large-Scale Image Search Engine," IEEE MSE, Dec. 2002, 4 pages, Irvine.
Lavrenko, V. et al., "Relevance Models for Topic Detection and Tracking," 6 pages, 2002.
Pallickara, S. et al., "Incorporating an XML Matching Engine in Distributed Brokering Systems," Proceedings of the International Conference on Parallel and Distributed Processing Techniques and Applications, (PDPTA'03), 2003, pp. 1-7.
PCT International Search Report and Written Opinion, PCT/US06/17846, Oct. 18, 2006, 11 Pages.

* cited by examiner

*Primary Examiner* — Pramila Parthasrathy
(74) *Attorney, Agent, or Firm* — Okamoto & Benedicto LLP

(57) ABSTRACT

A system and a method are disclosed for sensitive document management. The system includes one or more agents, a behavior analysis engine, a local policy engine, and a local matching service. The method identifies whether a document is sensitive, identifies behaviors applied to the document, determines whether the document contains sensitive information and determines whether to allow the identified behavior to continue based on security policies.

9 Claims, 3 Drawing Sheets

CASCADING SECURITY ARCHITECTURE

CROSS REFERENCE TO RELATED APPLICATIONS

This application claims a benefit of, and priority under 35 U.S.C. §119(e) to, U.S. Provisional Patent Application Ser. No. 60/679,458, entitled "Architecture Of Cascading Security Solution," by Fei Huang, Shu Huang, and Liwei Ren, filed on May 9, 2005, which is hereby incorporated by reference in its entirety.

The present invention is related to U.S. Utility patent application Ser. No. 11/361,340, entitled "Matching Engine with Signature Generation," by Liwei Ren, Dehua Tan, Fei Huang, Shu Huang, and Aiguo Dong, filed on Feb. 24, 2006, which claims a benefit of U.S. Provisional Patent Application Ser. No. 60/679,314 filed on May 9, 2005, the content of each of which is hereby incorporated by reference in its entirety.

The present invention is related to U.S. Utility patent application Ser. No. 11/361,447, entitled "Matching Engine for Querying Relevant Documents," by Liwei Ren, Shu Huang, Fei Huang, Aiguo Dong, and Dehua Tan, filed on Feb. 24, 2006, which claims a benefit of U.S. Provisional Patent Application Ser. No. 60/679,314 filed on May 9, 2005, the content of each of which is hereby incorporated by reference in its entirety.

BACKGROUND

1. Field of Art

The present invention generally relates to the field of information management technology, and more specifically, to the field of enterprise document management for protecting sensitive information.

2. Description of the Related Art

As computers and networks become more proliferated, powerful, and affordable, a growing number of enterprises are using both to perform critical tasks and manage sensitive information. However, the convenience provided by computers and networks is leading to easy duplication and distribution of sensitive information. Often, multiple copies of documents containing sensitive information (also called sensitive documents) find their way to endpoints of the network, for example in CD-ROMs, in memory sticks, and in other media. The proliferation of information makes it harder to protect sensitive information, and gives people with malicious intent more opportunities to access such sensitive information and leak it out to unintended parties.

This information leakage problem is also highlighted by regulations such as the Sarbanes-Oxley Act. Besides the significant accounting and control requirements imposed on publicly owned companies, the Act created a new oversight board for accounting firms auditing publicly traded companies (PCAOB). The PCAOB established auditing standards, including Standard 2, which recognized that senior management cannot simply certify controls on the system. Rather, controls also have to track and manage the way financial information is generated, accessed, collected, stored, processed, transmitted, and used through the system. As a result, there are high demands for enterprise document management for protecting sensitive information.

Highly sensitive information is traditionally stored in an isolated and secured computer, accessible only to authorized personals. When documents containing such information need to be duplicated or circulated, those seeking access typically follow a secure administration procedure (or policy) to prevent unauthorized access. By keeping such documents out of computer networks, it limits remote access of the sensitive information by the authorized personals. However, documents stored offline are unable to leverage other benefits provided by the networks, such as online file system backup. Moreover, conventional isolation-type security techniques are not reliable, since the access control relies upon people following the secure administration procedure. This administration procedure is difficult to manage with respect to education and enforcement of such security policies, and also can be quite costly to implement and monitor.

One conventional approach to prevent sensitive information leakage from endpoints of an enterprise network is to enforce a file based access control policy. This approach restricts access to certain sensitive documents to authorized users, while other users can access documents other than the sensitive documents. This approach is insufficient because it lacks deep inspection of the document content. Any intentional scrambling of the sensitive documents content can create documents not subject to restriction, causing the sensitive information to be leaked to unauthorized users.

Another general approach to prevent sensitive information leakage from endpoints is to enforce a user-based or application-based access control policy such as complex Access Control List (ACL) policies and firewalls against users and applications. In some instances, the ACL policies may be combined with local storage encryption. One shortcoming of such approaches is the difficulty in maintaining and managing different users and their corresponding privileges. This is particularly problematic when combined with local storage encryption, because such encryption also requires a complex key management system. Further, such approaches lack the deep inspection of the document content, and cannot prevent sensitive information leakage caused by intentional scrambling of sensitive documents.

One conventional approach to prevent sensitive information leakage from an enterprise network is to monitor network traffic within the network. A network sniffer or monitor device is attached on a router within the network, and analyzes network traffic. Sensitive data content is then identified and filtered out by the network sniffer. This approach is inadequate in that it cannot analyze encrypted network traffic. For example, any network traffic using the Hyper Text Transfer Protocol (HTTP) over Secure Socket Layer (SSL) protocol is encrypted for security, and cannot be monitored for sensitive information. Also, because information inspection by the network sniffer takes time, data going through the router is slowed down, affecting the network performance.

SUMMARY

Embodiments of the present invention manage the lifecycle of documents in endpoints of a document management system. The system determines whether a document contains sensitive information, and protects the document from unauthorized accessed based on the determination.

In one embodiment, a document management system is configured (or adapted) to detect and track sensitive documents in the endpoints of the system. Each endpoint of a network has filters identifying documents being processed by the endpoint. A behavior analysis engine detects the process activities applied to the documents and identifies a behavior(s) based on the detected process activities. A local matching service determines whether the documents contain sensitive information by applying one or more multiple matching techniques. Alternatively, the behavior analysis engine detects documents that are related to the identified documents, and the local matching service determines whether the identified documents contain sensitive information by determining whether the related documents contain sensitive information. If a document is determined to contain sensitive information, the system creates a record for the document and adds the record to a black list. A local policy engine determines whether to allow or to block the current process activities based on the behaviors, the content of the documents, and applicable security policies.

In another embodiment, a document management system is configured to detect sensitive documents being exported out of the endpoints of the system. For a given document, the system analyzes the document by checking whether a record of the document is in a black list. If no such record is present in the list, the system determines whether the document contains sensitive information by applying one or more multiple matching techniques. If the document is determined to contain sensitive information, the system creates a record for the document and adds the record to a black list, and a local policy engine determines whether to allow, to block, or to encrypt the document before being exported out of the endpoint.

One advantage of the disclosed embodiments is the scope and accuracy of the protection provided. Because the system detects all documents in motion, and determines whether a document is sensitive based on its content and user behavior, detection of a sensitive document is likely to be complete and accurate. Because the system analyzes user behavior based on activity-to-behavior patterns, intentional data scrambling can be detected and an appropriate cause of action may be taken relative to the detected document.

Another advantage is off-line protection of sensitive documents. Because most of the document management is achieved in the endpoint, the system can prevent leakage of sensitive information from the endpoint even when the endpoint is disconnected from the enterprise network.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

The Figures (FIGS.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

Generally, the disclosed embodiments describe a method and system to manage documents in an enterprise network and prevent sensitive information leakage. This method and system detects documents processed by an endpoint of the enterprise network and interferes with the user's behavior applied to the documents based on the content of the documents, the behaviors, and applicable security policies.

Architectural Overview

Figure 1:
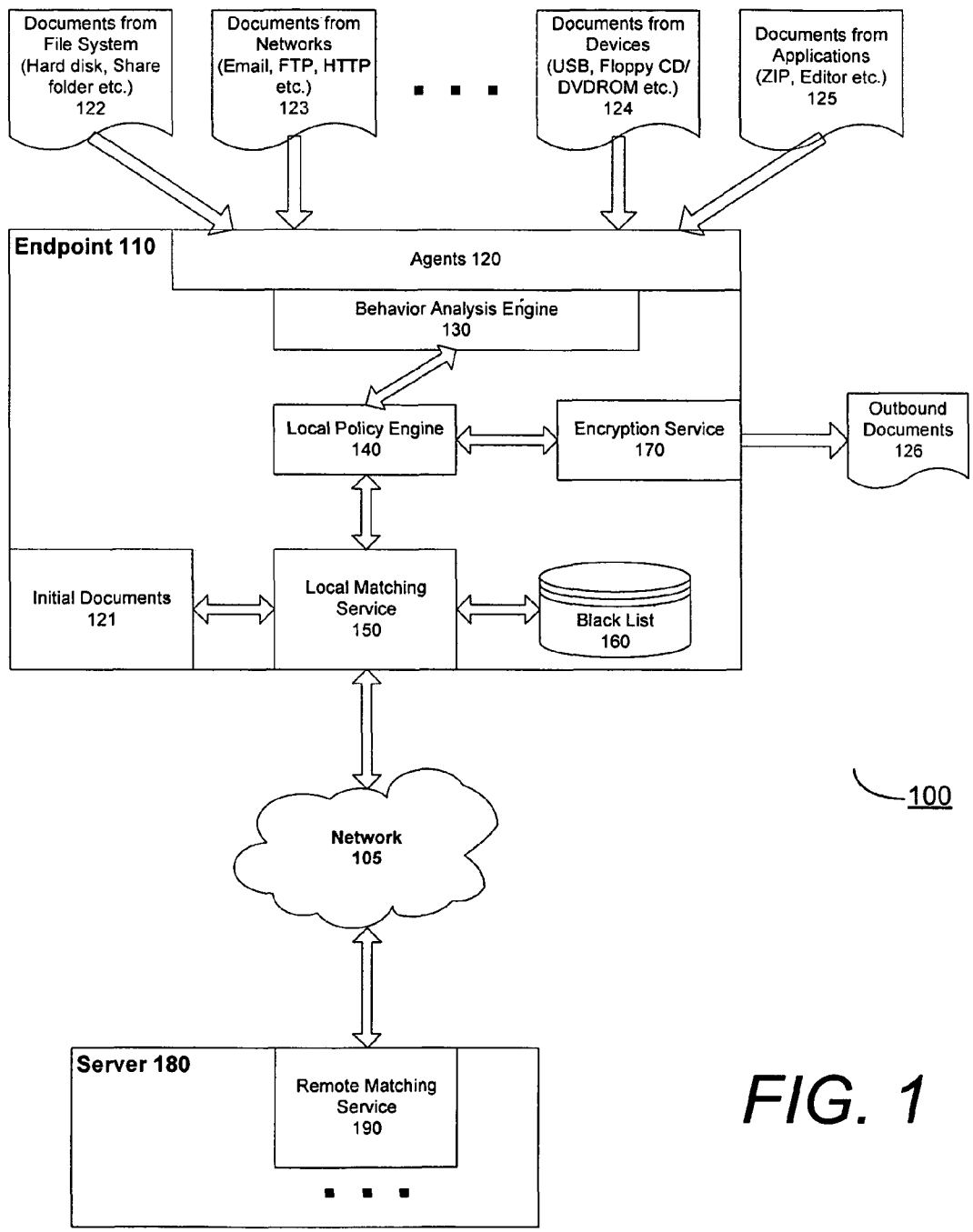
FIG. 1 illustrates one embodiment of an enterprise document security management system in accordance with the present invention.

Referring now to FIG. 1, it illustrates an embodiment of an enterprise document management system 100 in accordance with the present invention. The system 100 manages documents in an enterprise network and prevents sensitive information leakages. One example of the system 100 is a cascading security configuration. The system 100 includes at least one endpoint 110 and a server 180. The endpoint 110 can be a computer (e.g., laptop computers, desktop computers) or a device with data access capabilities (e.g., handheld computing devices, embedded devices with a processor and operating or control system). The server 180 functions as a central place of control for the system 100. Each of the endpoints 110 is connected to the server 180 through a network 105. The network 105 may be a wired or wireless network. Examples of the network 105 include the Internet, an intranet, a cellular network, or a combination thereof. It is noted that each of the endpoint 110 and the server 180 are structured to include a processor, memory, storage, network interfaces, and applicable operating system and other functional software (e.g., network drivers, communication protocols, etc.).

In one embodiment, the endpoint 110 includes one or more agents 120, a behavior analysis engine 130, a local policy engine 140, a local matching service 150, a black list 160, an encryption service 170, a local index database (not shown), and some optional initial documents 121. The behavior analysis engine 130 communicatively couples the agents 120 and the local policy engine 140. The local policy engine 140 communicatively couples the behavior analysis engine 130, the encryption service 170, and the local matching service 150. The local matching service 150 has access to the optional initial documents 121, the black list 160, the local index database, and the network 105.

The agents 120 are configured as software elements running at the endpoint 110 to perform one or more filtering functions. Examples of the agents 120 include file system filter drivers (also known as file system agent), network filter drivers (also known as network agent), device I/O filter drivers (also known as device I/O agent), and API hooking service. The agents 120, through application of its one or more filters, are configured to identify ("catch") documents in motion at the endpoint 110. Documents in motion are documents being presently processed by the endpoint 110. For example, a document being copied from a local hard disk of the endpoint 110 to a removable drive is a document in motion. Documents in motion include inbound documents and outbound documents 126.

The inbound documents include documents from file system 122, documents from networks 123, documents from devices 124, documents from applications 125, and the like.

The documents from file system 122 are documents loaded (or retrieved) from a local file system(s) of the endpoint 110 such as local hard disk, shared folders, etc. The documents from networks 123 are documents downloaded (or retrieved) from a network(s), such as documents attached in an email, downloaded via File Transfer Protocol (FTP), or HTTP. The documents from devices 124 are documents loaded (or retrieved) from input/output storage devices, for example, USB drives, floppy drives, CD/DVD ROM drives, and other devices connected to the endpoint 110. The documents from applications 125 are documents generated by applications such as file editors, zip/unzip utilities, user's own applications, copy/move utilities, and the like.

The outbound documents 126 are documents to be exported out of the endpoint 110. The destination of the outbound documents 126 can be a device such as a USB drive, an email recipient, a network storage device, a printer, or other devices of similar nature. In one embodiment, the destinations of an outbound document 126 include local storage devices of the endpoint 110, for example, a removable local hard disk.

The behavior analysis engine 130 is configured to analyze the behaviors of all active applications in the endpoint 110. It can identify documents relevant to the document in motion identified by the agent 120. The behavior analysis engine 130 can also be configured to keep track and analyze certain user process activities captured by the agents, such as print/printscreen, copy/cut and paste, send via email, upload through network, save/save-as, and the like. It can identify user behaviors such as intentional scrambling of sensitive documents based on the current user process activity, the analysis, and a collection of activity-to-behavior patterns.

The local policy engine 140 is configured to contain security policies. The security policies define a set of restrictions on document access and control (e.g., limiting access or modification rights of certain sensitive documents to certain categories of users), device input/output (I/O) (e.g., prohibiting exportation of sensitive documents without encryption), and certain user behaviors (e.g., prohibiting duplicating the content of sensitive documents). In one embodiment, the security policies are defined and maintained in a central policy service in the server 180 and are synchronized with the local policy engine 140 when the endpoint 110 boots up (or is otherwise initialized). The local policy engine 140 can also be configured to determine how a document is analyzed to detect sensitive information.

Figure 3:
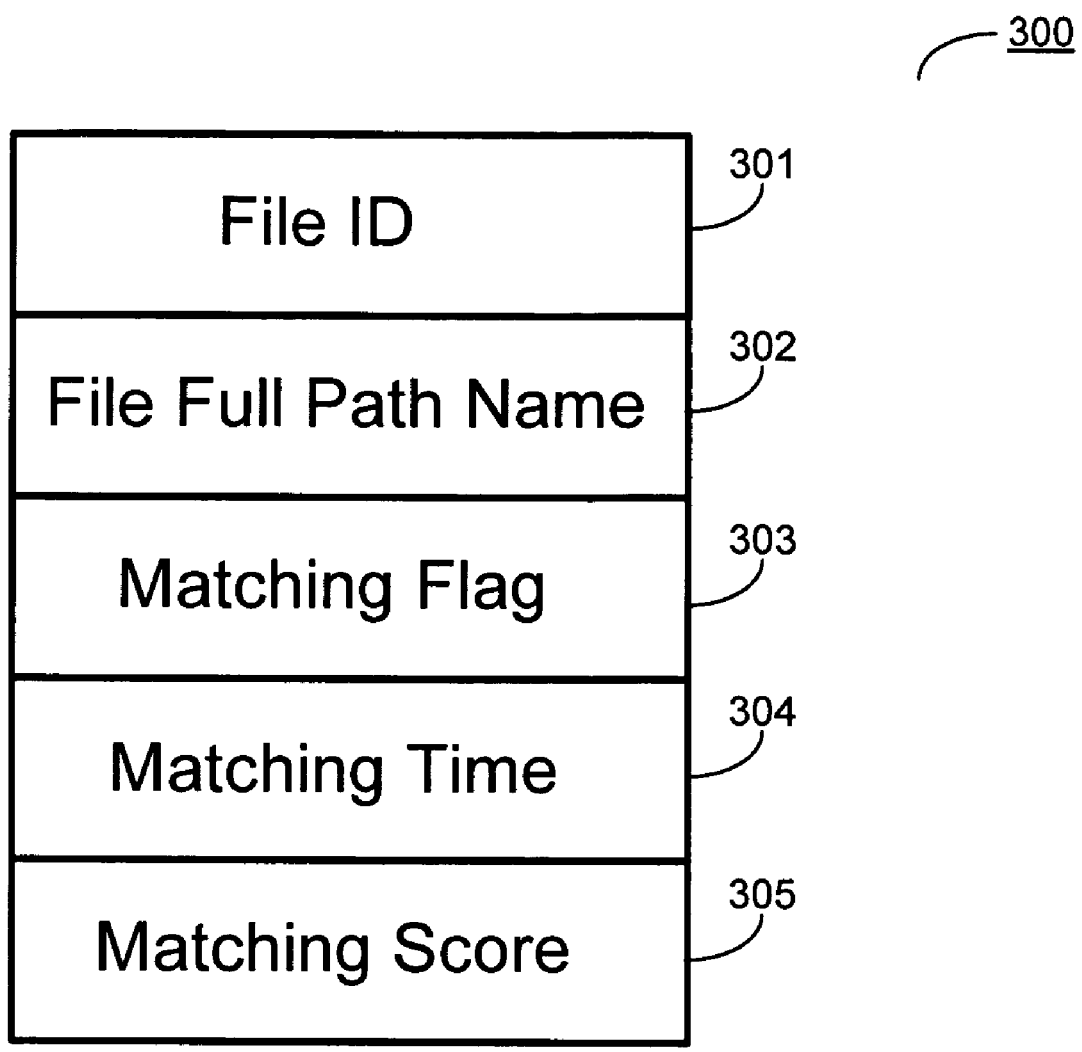
FIG. 3 is block diagrams illustrating the format for a record of a black list in accordance with the present invention.

The black list 160 is a list of records associated with sensitive documents. It is intended to keep track of all sensitive documents detected by the local matching service 150. The black list 160 can be stored in a relational database or any other type of database, or even in a plain structured file. Each record holds related information of the associated sensitive document. The data structure of a record 300 in the black list 160 is illustrated in FIG. 3. The record 300 has a file identifier (ID) 301, a file full path name 302, a matching flag 303, a matching time 304, and a matching score 305.

The file ID 301 is a unique integer representing the document associated with the record 300 assigned by the system 100 or the endpoint 110. The file full path name 302 is a text string indicating the location of the document within the system 100. The matching flag 303 is a true-false indicator of whether the associated document has been matched by the local matching service 150 and the remote matching service 190. In some embodiments, if a document can be determined to be a sensitive document without being matched by the local matching service 150 or the remote matching service 190 (e.g., a newly created copy of a document known to contain sensitive information), a record of the document is created and added to the black list 160.

The matching time 304 indicates the time when the document associated with the record 300 was matched by the local matching service 150 and/or the remote matching service 190. The matching time 304 can be used for purposes such as tracking and/or keeping the record 300 up-to-date. For example, the local matching service 150 can periodically check the sensitive documents associated with records having expiring matching times 304 and then update the matching times 304.

The matching score 305 measures the sensitivity of the associated document. The value of a matching score depends on the type of the match applied to the associated document, such as relevance detection matching, keyword matching, named entity recognition matching, to name just a few. The local matching service 150 and the remote matching service 190 can apply one or more types of matching to a document in motion to determine the matching score 305 of the associated record 300. For example, the local matching service 150 first applies a keyword matching to the document in motion. If the matching result exceeds a threshold, the local matching service 150 either determines that the document is sensitive, or transmits the document to the remote matching service 190, which applies a relevance detection matching to the document. Which matching techniques should be applied is defined by the local policy engine 140.

Relevance detection matching detects whether a document contains sensitive information by matching the content of the document with contents of documents known to contain sensitive information. A relevance score is calculated between the document and the sensitive documents. The local matching service 150 and/or the remote matching service 190 determine whether the document contains sensitive information based on the relevance score. The relevance score can be the matching score 305. Examples of relevance detection matching can be found in U.S. patent application Ser. No. 11/361,447, titled "Matching Engine for Querying Relevant Documents," by Liwei Ren, et al., filed on Feb. 4, 2006, the contents of which are hereby incorporated by reference.

Keyword matching detects whether a document contains sensitive information by matching a collection of keywords related to sensitive information with the content of the document. The collection of keywords can be set by authorized users in the server 180 and later synchronized with the local matching service 150 of endpoints 110 within the system 100. Alternatively, the collection of keywords can be determined by the remote matching service 190 based on users' configuration. A sensitive score is calculated based on the match result. The sensitive score can be the matching score 305.

Named entity recognition matching detects whether a document contains sensitive information by processing the content of the document to detect the named entities described in the document, and match the detected named entities to a collection of named entities related to sensitive information. The collection of named entities can be set by authorized users in the server 180 and later synchronized with the local matching service 150 of endpoints 110 within the system 100. Alternatively, the collection of named entities can be determined by the remote matching service 190 based on users' configuration. Examples of named entities include SSN (social security number), phone number, credit card number, birthday date, home addresses, email address and bank account number, and the like. A recognition score is calculated based on the match result. The recognition score can be the matching score 305.

It is noted that the above matching techniques are only examples of matching methods used by the system 100 to identify a sensitive document. The endpoint 110 can be configured to use one or more of the above techniques along with other methods. Alternatively, the endpoint 110 can be configured to use methods other than the above matching techniques.

The local index database is configured to maintain an index for all sensitive documents in the system 100. The index database is created in the server 180 initially and subsequently transmitted to endpoints 110. In some embodiments, the local index database also maintains an index for all documents in the endpoint 110, not just sensitive documents. In some other embodiments, the local index database maintains an index for all sensitive documents in the system 100, not just those in the endpoint 110. The local index database is configured to periodically synchronize with a central index database. The central index database is described in detail later in the application.

Referring back to FIG. 1, the local matching service 150 is configured to detect sensitive documents. In some embodiments, the local matching service 150 works together with a remote matching service 190 to detect sensitive documents. The remote matching service 190 resides in the server 180 and is described further below. The remote matching service 190 is transparent to components of the endpoint 110 other than the local matching service 150. Therefore, where the sensitive information detection is conducted is transparent to the other components of the endpoints 110, such as the local policy engine 140.

The local matching service 150 can use a variety of matching techniques to detect sensitive documents. In some embodiments, the local policy engine 140 determines the matching techniques for the local matching service 150. In one embodiment, the local matching service 150 first conducts a keyword matching or a named entity recognition matching on a document in motion (also known as target document). If the result of the matching suggests that the target document is a sensitive document, the local matching service 150 may transmit the document to the remote matching service 190 for further detection, depending on how matching policies are defined. In another embodiment, the local matching service 150 searches in the local index database for documents similar to the target document. If any of the similar documents has a record in the black list 160, the local matching service 150 may determine that the target document is sensitive or transmit the target document to the remote matching service 190 for further detection.

The initial documents 121 include all the files residing on the storage of the endpoint 110 before the system 100 is installed in the endpoint 110. The initial documents can include both sensitive documents and documents that do not contain sensitive information.

In one embodiment, the local matching service 150 scans the storage of the endpoint 110 for the initial documents 121 and processes them for sensitive information detection. Depends on how the local policy engine 140 is configured, the local matching service 150 may conduct one or more matching techniques (e.g., named entity recognition matching, keyword matching, relevance detection matching, etc.) on the initial documents 121 to detect sensitive documents. Alternatively, the local matching service 150 can work together with the remote matching service 190 to process the initial documents 121. For those initial documents 121 determined to be sensitive, the local matching service 150 indexes them and stores in the local index database. The local matching service 150 creates a record for each detective sensitive document and adds to the black list 160. Sometimes, these initial documents 121 are also referred to as documents at rest.

The encryption service 170 is configured to encrypt sensitive outbound documents before sending them to their destination sites. The destination sites can be an external device such as a USB drive, an email recipient, a network storage device, and the like. In one embodiment, the encryption service 170 encrypts sensitive documents before they are stored ("saved") in the local storage of the endpoint 110. The encryption is conducted according to the security policies from the local policy engine 140. The encryption service 170 is intended to keep sensitive information from unauthorized access. The encrypted documents cannot be accessed at their destination sites unless the destination sites are authorized by the server security policies. In some embodiments, the encrypted documents can only be accessed in a computer with the enterprise document management system 100 installed. The security policies can also require the user to be first authorized by the system 100 before accessing the encrypted documents.

In one embodiment, the server 180 includes a remote matching service 190, a central policy service (not shown), and a central index database (not shown). The server 180 functions as a central place of control for the system 100. It is noted that the server 180 is located separate from an endpoint 110, but it also can reside within the same machine so that the machine functions both as the endpoint 110 and the server 180 in the enterprise network.

The central policy service is configured to maintain a set of security policies and synchronize with the local policy engines 140 of endpoints 110 within the system 100. In one embodiment, the server 180 includes a user interface for authorized users to setup and modify the security policies. The central policy service can also be configured to maintain a set of activity-to-behavior patterns and synchronize with the behavior analysis engine 130 of endpoints 110 within the system 100.

The central index database is configured to maintain an index for all sensitive documents process by the remote matching service 190 and the local matching service 150 of each endpoint 110 inside the system 100. The central index database periodically synchronizes with the local index database of each endpoint 110 inside the system 100.

The remote matching service 190 is configured to detect sensitive documents. In one embodiment, the remote matching service 190 searches in the central index database for sensitive documents relevant to the target document. If the remote matching service 190 finds sensitive documents relevant to the target document, and the relevance score exceeds a threshold, it determines that the target document contains sensitive information.

It is noted that the remote matching service 190, the central police service, and the central index database can be configured on one or more conventional computing systems having a processor, memory, storage, network interfaces, peripherals, and applicable operating system and other functional software (e.g., network drivers, communication protocols, etc.). In addition, it is noted that the agents 120, the behavior analysis engine 130, the local policy engine 140, the local matching service 150, and the encryption service 170 are logically configured to function together and can be configured to reside on one physical system or across multiple physical systems.

Overview of Methodology

Figure 2:
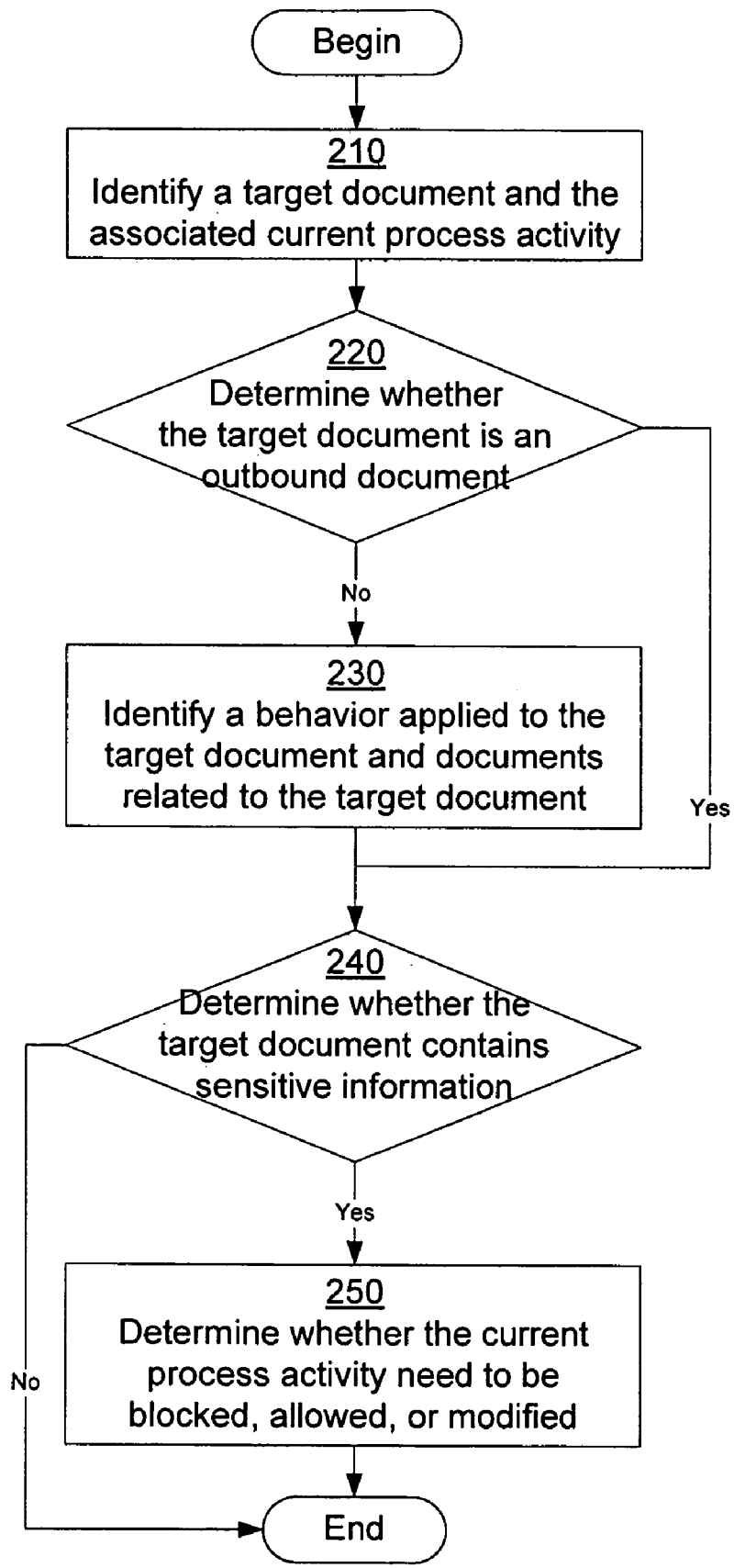
FIG. 2 illustrates one embodiment of a process for detecting and managing lifecycle of documents in accordance with the present invention.

FIG. 2 illustrates one embodiment of a process for managing lifecycle of sensitive documents in an endpoint 110 in accordance with the present invention. The process starts and an agent 120 identifies 210 a document in motion (also known as target document), along with the current process activity to be performed on the target document. The agent 120 holds the current process activity, notifies (or signals) the behavior analysis engine 130 of the target document and the current process activity, and waits for a signal indicating whether to continue with the current process activity. If the agent 120 is later signaled by the behavior analysis engine 130 to block the current process activity, it can raise an exception and stop the current process activity; otherwise the agent 120 lets the current process activity continue.

The process of identifying 210 a target document is illustrated by the following example. A user of the endpoint 110 attempts to make a copy of a local document named "TestA.doc" (also known as the "TestA.doc" document) to an external USB drive. In order to copy the "TestA.doc" document, the file system of the endpoint 110 accesses the document, which triggers the file system agent 120 to identify 210 the "TestA.doc" document as a target document, and notifies the behavior analysis engine 130 of the target document and the current process activity—file accessing.

After the behavior analysis engine 130 receiving information about the target document and the current process activity, it determines 220 whether the target document is an outbound document 160. As defined earlier, the outbound documents 126 are documents to be exported out of the endpoint 110. The behavior analysis engine 130 can determine 220 whether the target document is an outbound document 160 based on the received current process activity. If the current process activity is related to outputting the target document to an external device (e.g., printing the target document, transmitting the target document over the network 105, storing the target document to an external storage device, etc.), the behavior analysis engine 130 determines that the target document is an outbound document.

If the behavior analysis engine 130 determines 220 that the target document is not an outbound document, it identifies 230 a behavior based on process activities applied to the target document. In one embodiment, the behavior analysis engine 130 has access to process activities previously applied to the target document and a collection of activity-to-behavior patterns. The behavior analysis engine 130 applies the activity-to-behavior patterns to the process activities (both the current process activity and those applied previously to the target document) to identify 230 behaviors. A behavior is one or more process activities that collectively achieve a certain pre-defined goal. For example, the behavior analysis engine 130 can identify 230 a send-sensitive-document behavior if it detects that an application opens and reads a sensitive document and then attempts to send out some data through the network 105. In this example, the pre-defined goal of the send-sensitive-document behavior is to send content of the sensitive document out. The behavior analysis engine 130 can identify 230 multiple behaviors from the same set of process activities. Alternatively, the behavior analysis engine 130 may not be able to identify 230 any behavior from the set of process activities.

In one embodiment, if the behavior analysis engine 130 either identifies 230 no behavior or determines that the behavior(s) identified is of no importance, it terminates the process and signals the agent 120 to allow the halted current process activity to continue. Likewise, if the behavior analysis engine 130 determines that the identified behavior is prohibited, it terminates the process and signals the agent 120 to block the halted current process activity.

The behavior analysis engine 130 can also be configured to identify 230 documents related to the target document based on the process activities (both the current process activity and those applied previously to the target document). For example, if a user copies some content from a first document and pastes it to a second document, the behavior analysis engine 130 detects that the first documents is a relevant document of the second document.

Continuing with the example of copying the "TestA.doc" document to an USB drive, based on the current process activity—file accessing, the behavior analysis engine 130 identifies 230 no behavior, and notifies the file system agent 120 to allow the file system to access the document. The file system then creates a new document and attempts to copy the content of the "TestA.doc" document into the new document. The file system agent 120 identifies 210 the new document along with the current process activity—file copying, and notifies the behavior analysis engine 130. The behavior analysis engine 130 determines that the new document is not an outbound document. The behavior analysis engine 130 identifies 230 a file-copying behavior based on the current process activity (file copying) applied to the new document. The behavior analysis engine 130 also identifies 230 the "TestA.doc" document as a document related to the new document.

The behavior analysis engine 130 notifies (or signals) the local policy engine 140 of the target document along with the identified behavior(s) and relevant documents, which passes on to the local matching service 150. The local matching service 150 determines 240 whether the target document contains sensitive information.

Assuming the behavior analysis engine 130 identifies 230 one or more relevant documents of the target document, the local matching service 150 determines 240 whether the target document contain sensitive information based on the identified relevant documents. If the local matching service 150 determines that at least one of the identified relevant documents has a record in the black list 160 representing it, the local matching service 150 can determine 240 that the target document contains sensitive information, and signals the local policy engine 140 of the determination.

The local matching service 150 determines whether there is a record in the black list 160 representing the target document. As described above, each record in the black list 160 represents a sensitive document. If the target document has a record in the black list 160, the local matching service 150 determines 240 that the target document contain sensitive information. If no record in the black list 160 represents the target document, the local matching service 150 applies matching techniques as defined in the local policy engine 140 and determines 240 whether the target document contain sensitive information based on the matching results. As described above, the local matching service 150 can work together with the remote matching service 190 to conduct the determination 240. The remote matching service 190 is transparent to other components of the endpoint 110.

If the local matching service 150 determines 240 that the target document contains no sensitive information, it signals the local policy engine 140 of this finding. Otherwise, if there is no record representing the target document in the black list 160, the local matching service 150 creates (or generates) such a record, adds the record into the black list 160, and signals the local policy engine 140 that the target document contains sensitive information. The structure of the created record was described with respect to FIG. 3.

The local matching service 150 assigns a file ID to the target document and stores the file ID in the file ID field 301. Alternatively, the file ID can be assigned by the remote matching service 190. The local matching service 150 saves the source address of the target document in the file full path name 302, sets the matching flag 303 to be true, and sets the matching time 304 to be the present system time. The local matching service 150 determines a matching score for the target document based on the method used. For example, if relevance detection matching is applied, the local matching service 150 adds the relevance scores between the document and each of the matching sensitive documents and stores the total in the matching score 305.

Continuing with the example of copying the "TestA.doc" document to an USB drive, the behavior analysis engine 130 notifies the local policy engine 140 of the new document along with the identified behavior (file copying) and relevant document ("TestA.doc" document) to the local policy engine 140, which passes on to the local matching service 150. Assuming the local matching service 150 locates a record in the black list 160 corresponds to the "TestA.doc" document, the local matching service 150 determines 240 that the new document contains sensitive information. Otherwise, the local matching service 150 invokes matching services to the new document to determine whether it contains sensitive information. Assuming that the new document is determined 240 to contain sensitive information, the local matching service 150 creates a record representing the new document, adds the record to the black list 160, and signals the local policy engine 140 that the new document contains sensitive information.

The local policy engine 140 determines 250 whether the current process activity needs to be blocked or allowed based on the signal from the local matching service 150 indicating whether the target document contains sensitive information. If the local matching service 150 signals the local policy engine 140 that the target document does not contain sensitive information, the local policy engine 140 signals the agent 120 (via the behavior analysis engine 130) to allow the current process activity to continue. Otherwise the local policy engine 140 determines applicable security policies and applies them to the target document and the behavior(s) to determine 250 whether the current process activity needs to be blocked or allowed, and signals the agent 120 (via the behavior analysis engine 130) accordingly.

Continuing with the example of copying the "TestA.doc" document to an USB drive, assuming content of sensitive document is allowed to be duplicated, the local policy engine 140 determines 250 that the current process activity of the new document should continue, and signals the file system agent 120 to continue the current process activity of copying the content of the "TestA.doc" document to the new document.

If the behavior analysis engine 130 determines 220 that the target document is outbound document, it passes the target document to the local policy engine 140, which passes on to the local matching service 150. The local matching service 150 determines 240 whether the target document contain sensitive information. As described above, depending on how the local policy engine 140 is configured, the local matching service 150 can apply one or more matching techniques to determine 240 whether the target document contain sensitive information. For example, the local matching service 150 can first determine whether there is a record in the black list 160 representing the target document. As described above, each record in the black list 160 represents a sensitive document. If the target document has a record in the black list 160, the local matching service 150 determines 240 that the target document contains sensitive information, otherwise the local matching service 150 applies matching techniques as defined in the local policy engine 140 and determines 240 whether the target document contain sensitive information based on the matching results. The local matching service 150 signals the local policy engine 140 the result of the determination 240.

The local policy engine 140 determines 250 whether the current process activity needs to be blocked or allowed based on the signal from the local matching service 150 and security policies. If the local matching service 150 signals the local policy engine 140 that the target document does not contain sensitive information, the local policy engine 140 signals the agent 120 (via the behavior analysis engine 130) to allow the current process activity to continue. Otherwise the local policy engine 140 determines applicable security policies and applies them to the target document to determine 250 whether to allow the exportation, to block the exportation, or to encrypt the target document before the exportation, and signals the agent 120 (via the behavior analysis engine 130) accordingly.

When the local policy engine 140 determines that the target documents needs to be encrypted, it also signals the encryption service 170 to encrypt the target documents. In some embodiments, when the agent 120 is signaled that the target document is to be encrypted, it marks the target document as needs to be encrypted and needs to be filtered by the encryption service 170, so next time any content modification happens on this target document, the new content will be encrypted by the encryption service 170.

Continuing with the example of copying the "TestA.doc" document to an USB drive, the file system attempts to save the new document to the USB drive. The file system agent 120 identifies 210 the new document along with the current process activity—file saving to external device, and notifies the behavior analysis engine 130. The behavior analysis engine 130 determines 220 that the new document is an outbound document and notifies the local matching service 150. Because there is a record in the black list 160 representing the new document, the local matching service 150 determines 240 that the new document contains sensitive information and notifies the local policy engine 140.

Assuming there is a security policy requiring sensitive document to be encrypted before being saved in external devices, the local policy engine 140 signals the encryption service 170 to encrypt the new document before saving it to the designated external USB drive. The local policy engine 140 also notifies the file system agent 120 that the new document is encrypted and signals the file system agent 120 to allow the current process activity to continue. The file system agent 120 continues the current process activity and saves the new document to the external USB drive.

One advantage of the present invention is the scope and accuracy of the protection provided. The system detects all documents in motion and at rest (by its scanning capability), and determines whether a document is sensitive based on its content and user behaviors, which provides for accurate detections of sensitive documents. The system also analyzes user behavior based on activity-to-behavior patterns, so that intentional data scrambling can be detected and reacted properly.

Another advantage of the present invention is the off-line protection of sensitive documents. Document management beneficially is achieved in the endpoint, so that the system can prevent leakage of sensitive information from the endpoint even when the endpoint is disconnected from the enterprise network.

Further, the features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations. The software may be written or coded using a programming language. Examples of programming languages may include C, C++, BASIC, Perl, Matlab, Pascal, Visual BASIC, JAVA, ActiveX, assembly language, machine code, and so forth.

The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Further, some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

Moreover, some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a system and a process for document management and sensitive information leakage prevention through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for managing documents with sensitive information at an endpoint of a system, the method comprising:
   identifying, by an agent configured as software elements programmed to run on a computing device, a target document and an associated current process activity, wherein the associated current process activity comprises an operation to be performed on the target document;
   determining, by the agent, whether the target document is an outgoing document which is a document that is to be exported out of the endpoint;
   if the target document is determined to not be an outgoing document, then identifying, by the agent, a behavior applied to the target document;
   determining, by the agent, whether the target document contains sensitive information; and
   responsive to the target document containing the sensitive information, the agent determining whether the current process activity is to be blocked allowed or modified,
   wherein after the agent identifies the target document and the associated current process activity, the agent holds the current process activity, notifies a behavior analysis engine of the target document and the current process activity, and waits for a signal from the behavior analysis engine indicating whether to continue with the current process activity,
   wherein the agent raises an exception and stops the current process activity if the agent is signaled by the behavior analysis engine to block the current process activity, otherwise the agent lets the current process activity to continue.

2. The method of claim 1, wherein the identification of the behavior applied to the target document involves applying activity-to-behavior patterns to process the current process activity and activities previously applied to the target document, and wherein a behavior comprises one or more process activities which collectively achieve a pre-defined goal.

3. The method of claim 1, wherein the agent determines whether the target document contains sensitive information by:
   determining whether a record of the target document exists in a black list of records, wherein each record in the black list represents a sensitive document;
   responsive to there being no record of the target document in the black list, performing matching as defined by a local policy engine at the endpoint; and
   responsive to results of the matching, determining whether the target document contains the sensitive information.

4. A non-transitory computer-readable storage medium structured to store instructions executable by a processor, the instructions when executed causing a processor to: identify a target document and an associated current process activity, wherein the associated current process activity comprises an operation to be performed on the target document;
   determine whether the target document is an outgoing document which is a document that is exported out of the endpoint;
   identify a behavior applied to the target document if the target document is determined not to be an outgoing document: determine whether the target document contains sensitive information; and
   responsive to the target document containing the sensitive information, determining whether the current process activity is to be blocked, allowed, or modified, wherein the instructions when executed by the processor further cause the processor, after the target document and the associated current process activity are identified, to hold the current process activity, notify a behavior analysis engine of the target document and the current process activity, and wait for a signal from the behavior analysis engine indicating whether to continue with the current process activity, and wherein the instructions when executed by the processor further cause the processor to raise an exception and stop the current process activity if the behavior analysis engine provides a signal to block the current process activity.

5. The non-transitory computer-readable storage medium of claim 4, wherein the identification of the behavior applied to the target document involves applying activity-to-behavior patterns to process the current process activity and activities previously applied to the target document, and wherein a behavior comprises one or more process activities which collectively achieve a pre-defined goal.

6. The non-transitory computer readable storage medium of claim 4, wherein the determination of whether the target document contains sensitive information involves:
   determining whether a record of the target document exists in a black list of records, wherein each record in the black list represents a sensitive document; responsive to there being no record of the target document in the black list, performing matching as defined by a local policy engine at the endpoint; and
   responsive to results of the matching, determining whether the target document contains the sensitive information.

7. A computer apparatus comprising: a non-transitory data storage configured to store computer-readable instructions and data; a processor configured to execute the computer-readable instructions, a plurality of agents configured as software elements running on the computer apparatus, wherein each agent is configured to identify a document in motion and a current process activity to be performed on the document; a behavior analysis engine configured to receive notifications of the current process activities from the agents and provide to the agents signals which indicate whether to continue with a current process activity; a local policy engine configured to identify a behavior based on the current process activity and process activities previously applied to the target document; and a local matching service configured to determine whether the document contains sensitive information wherein each agent is further configured to determine whether the target document is an outgoing document which is a document that is exported out of the computer apparatus, identify a behavior applied to the target document if the target document is determined not to be an outgoing document, determine whether the target document contains sensitive information; and responsive to the target document containing the sensitive information, determine whether the current process activity is to be blocked, allowed, or modified, after the target document and the associated current process activity are identified, to hold the current process activity, notify a behavior analysis engine of the target document and the current process activity, and wait for a signal from the behavior analysis engine indicating whether to continue with the current process activity, and raise an exception and stop the current process activity if the behavior analysis engine provides a signal to block the current process activity.

8. The computer apparatus of claim 7, wherein the identification of the behavior applied to the target document involves applying activity-to-behavior patterns to process the current process activity and activities previously applied to the target document, and wherein a behavior comprises one or more process activities which collectively achieve a pre-defined goal.

9. The computer apparatus of claim 7, wherein each agent is configured to determine whether the target document contains sensitive information by: determining whether a record of the target document exists in a black list of records, wherein each record in the black list represents a sensitive document; responsive to there being no record of the target document in the black list, performing matching as defined by a local policy engine at the computer apparatus; and responsive to results of the matching, determining whether the target document contains the sensitive information.

* * * * *